United States Patent [19]

Mikamo

[11] Patent Number: 5,630,115
[45] Date of Patent: May 13, 1997

[54] METHOD OF REWRITING INFORMATION ON A RECORD MEDIUM BY REWRITING ONLY CHANGED PORTIONS

[75] Inventor: Noboru Mikamo, Tachikawa, Japan

[73] Assignee: Olympus Optical Co., Ltd., Tokyo, Japan

[21] Appl. No.: 59,127

[22] Filed: May 10, 1993

[30] Foreign Application Priority Data

May 11, 1992 [JP] Japan .................................... 4-117564

[51] Int. Cl.⁶ .................................................. G06F 17/30
[52] U.S. Cl. ........................................... 395/621; 395/438
[58] Field of Search .................................. 395/600, 404, 395/438

[56] References Cited

U.S. PATENT DOCUMENTS

| | | | |
|---|---|---|---|
| 4,558,413 | 12/1985 | Schmidt et al. | 395/600 |
| 5,029,125 | 7/1991 | Sciupac | 395/600 |
| 5,040,110 | 8/1991 | Miki et al. | 395/600 |
| 5,119,291 | 6/1992 | Flannagan et al. | 395/275 |
| 5,230,075 | 7/1993 | Premerlani et al. | 395/600 |
| 5,247,658 | 9/1993 | Barrett et al. | 395/600 |
| 5,247,660 | 9/1993 | Ashcraft et al. | 395/600 |
| 5,288,982 | 2/1994 | Hosoya | 235/454 |
| 5,349,577 | 9/1994 | Mekamo | 369/47 |
| 5,392,427 | 2/1995 | Barret et al. | 395/600 |

OTHER PUBLICATIONS

Martin, *Computer Data–Base Organization*, 2nd Ed 1977, pp. 358–374, Prentice–Hall.

*Primary Examiner*—Thomas G. Black
*Assistant Examiner*—Jack M. Choules
*Attorney, Agent, or Firm*—Watson Cole Stevens Davis, P.L.L.C.

[57] ABSTRACT

In a method of rewriting a file data recorded on a record medium such as an optical memory card in successive tracks each constituting a minimum unit record, the file data is read out of the optical memory card as old records of an old file, the thus read out respective records of the old file are compared with corresponding records of a new file formed on a main memory disk to detect a revised record, and only the thus detected revised record is recorded on the record medium. On the main memory disk, there is further formed recording position information denoting a position on the record medium at which said revised record has been recorded and the thus formed recording position information is recorded on the record medium together with old and new file names. Only the revised record is recorded on the record medium, so that its data record area can be utilized optimally.

22 Claims, 12 Drawing Sheets

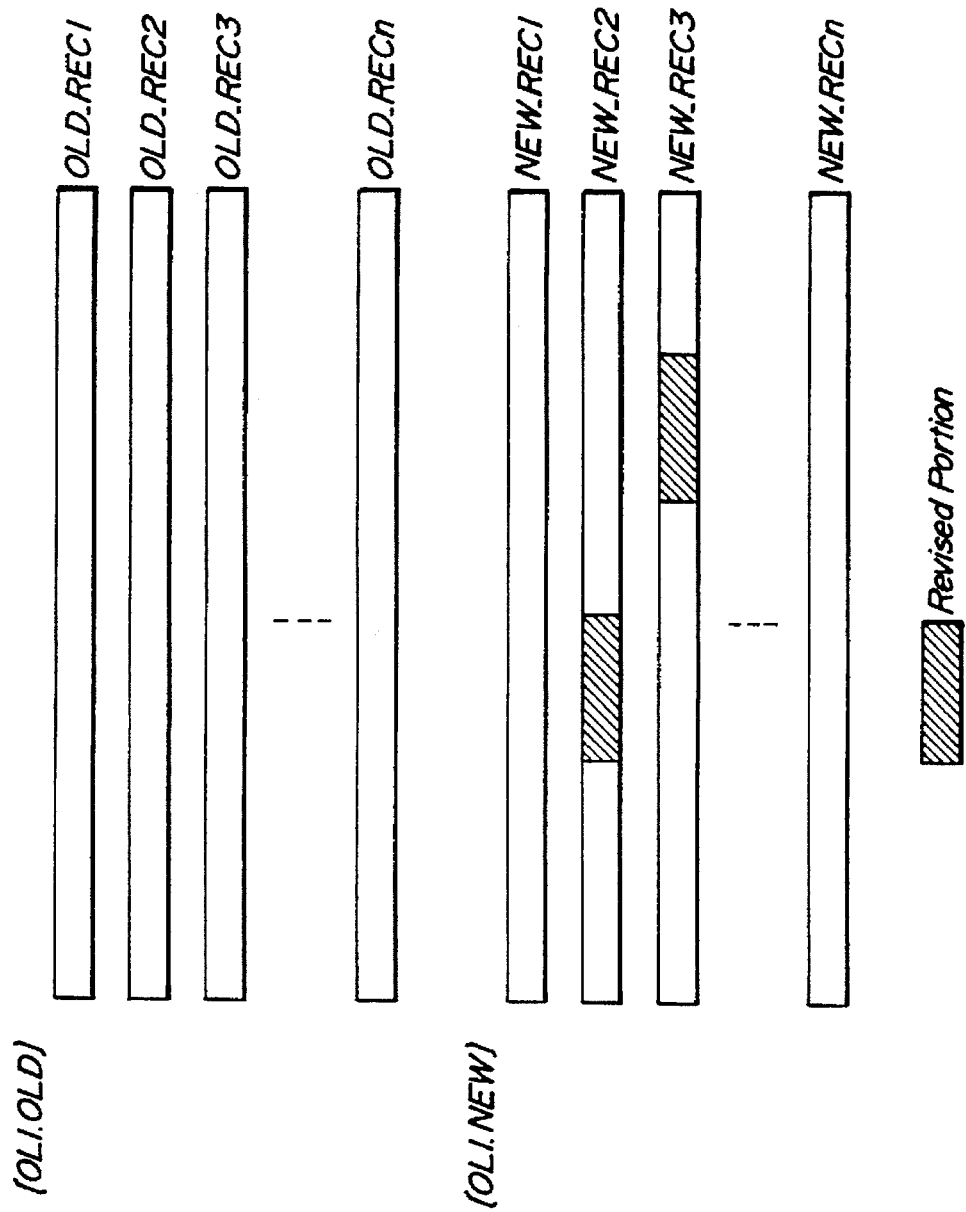

FIG. 3A  Old File
FIG. 3B  New File

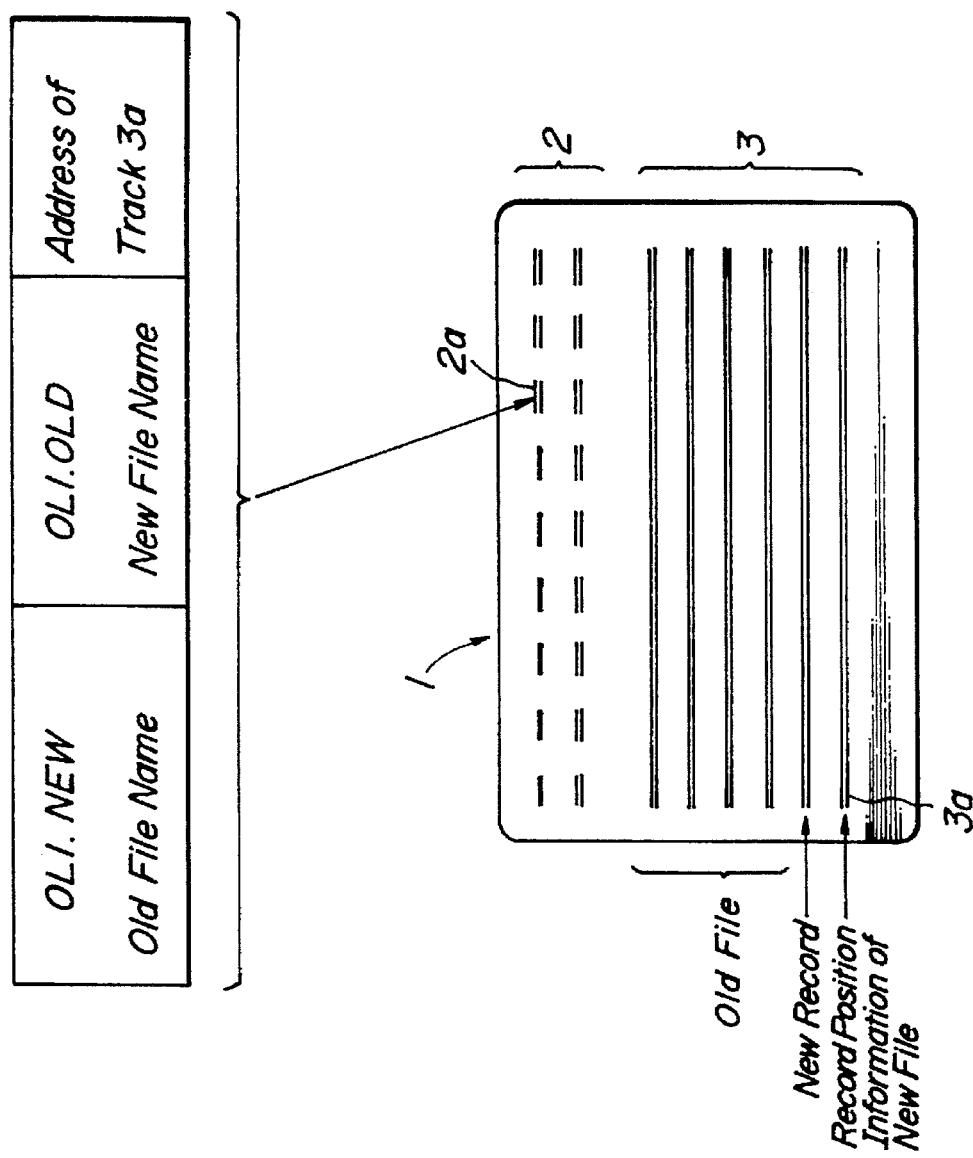

FIG. 6A  Old File

| OLD.TRK1 | OLD.TRK2 | OLD.TRK3 | OLD.TRK4 | - - - - - | OLD.TRKn |

FIG. 6B  New File

| OLI.OLD | OLI.NEW | OLD.TRK2 | NEW.TRK2 | OLD.TRK3 | NEW.TRK3 |
| Old File Name | New File Name | | | | |

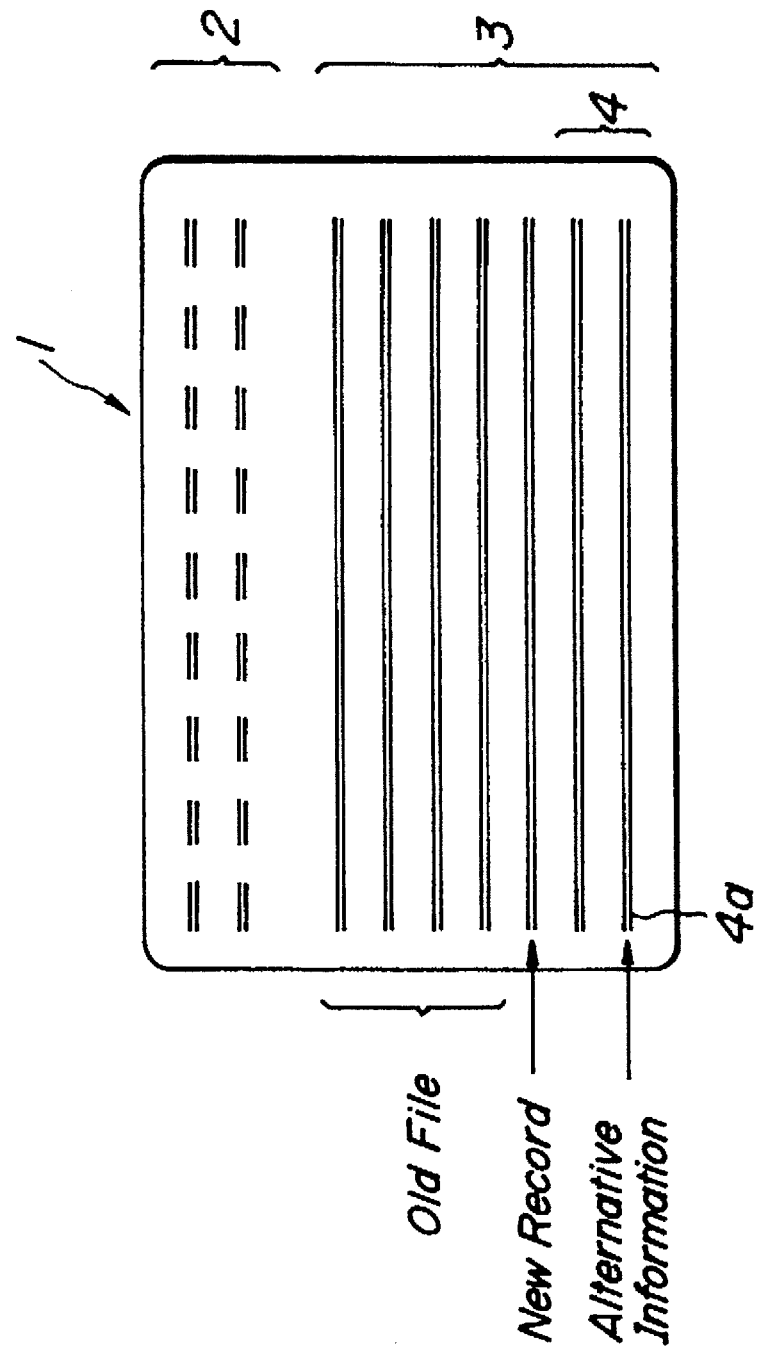

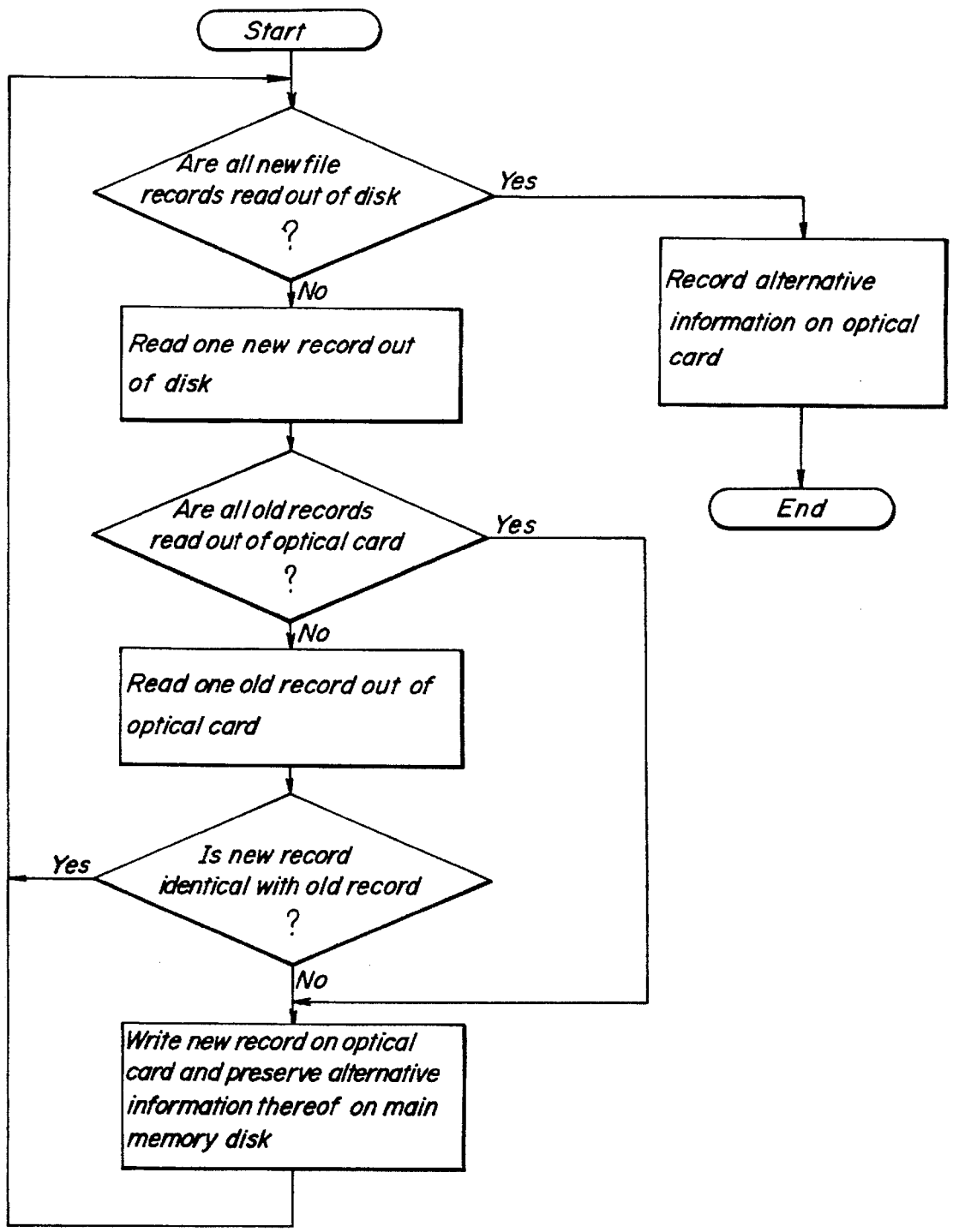
FIG_8

FIG_9
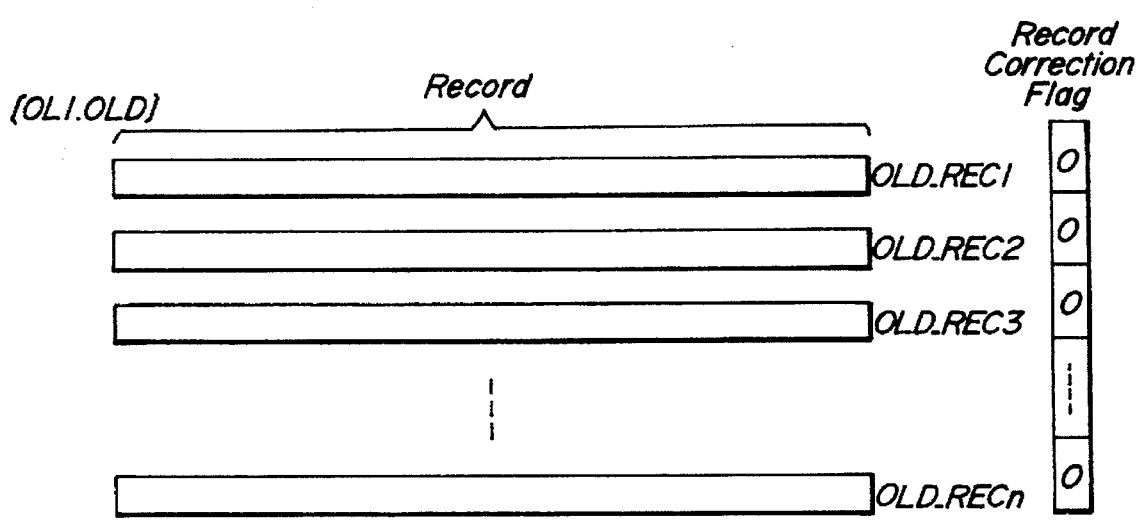

FIG_11A Old File
FIG_11B New File

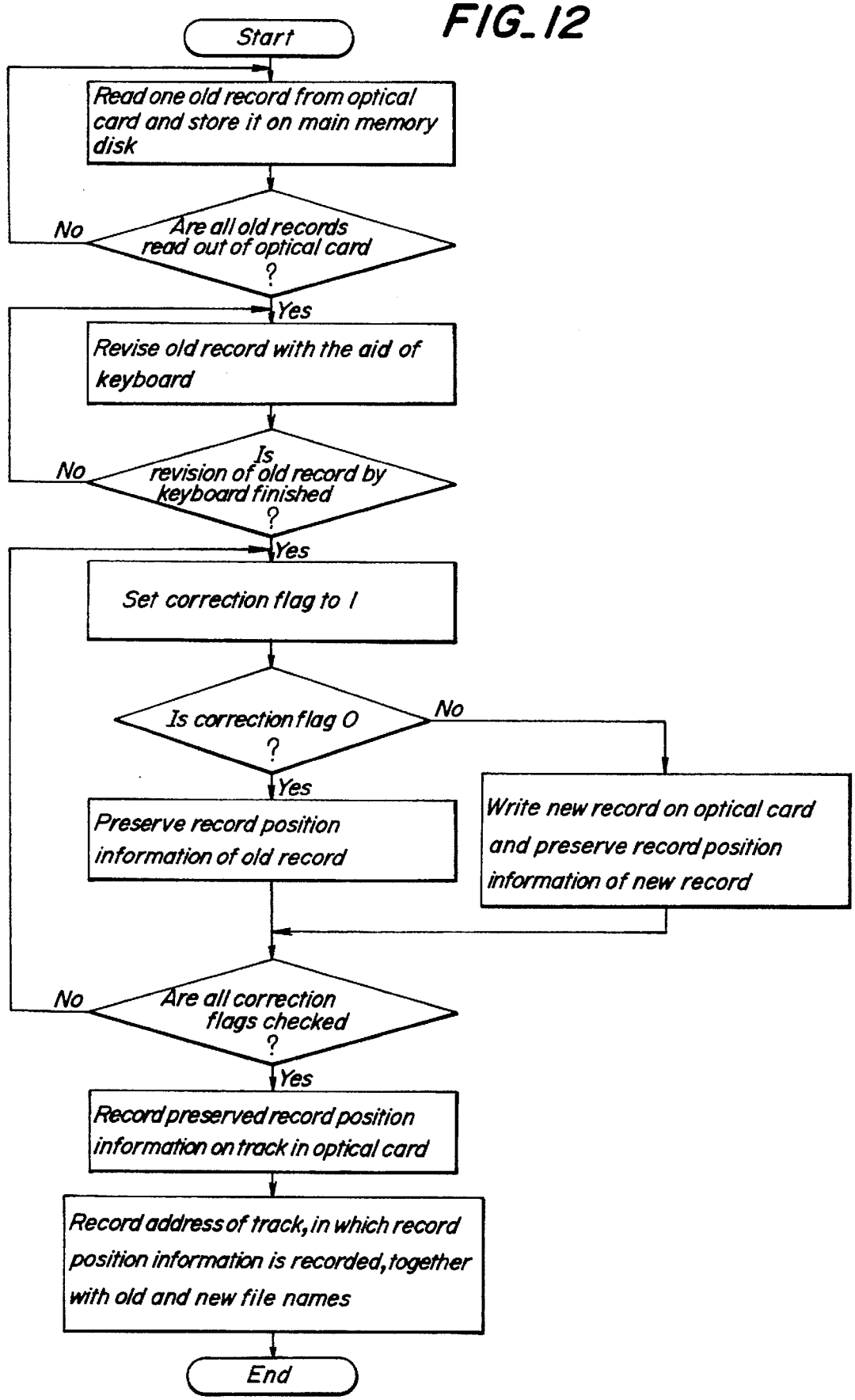
FIG_12

METHOD OF REWRITING INFORMATION ON A RECORD MEDIUM BY REWRITING ONLY CHANGED PORTIONS

BACKGROUND OF THE INVENTION

1. Field of the Invention

This invention relates to a method of rewriting information recorded on a record medium, and more particularly to a method for rewriting information recorded on an information record medium of write-once record type such as an optical memory card or an optical disk.

2. Description of the Related Art

In case where correction or rewriting of information is required after the information has been recorded on a write-once type record medium such as an optical card or an and optical disk, the old information is rewritten by recording new corrected or revised information. When all the corrected information is newly recorded, a portion of the information which is not changed at all is recorded on the record medium in a duplicate manner, so that a data record area on the record medium is wasted and could not be utilized optimally. Such a problem is not serious when an amount of the data recorded on the record medium is small. However, when a large amount of data such as image data is used, a considerably large data record area is wasted for rewriting the information.

In case of using a rewritable type record medium, the old information can be erased and the new information is recorded thereon, so that the data record area is not wasted at all. However, when a speed of recording the information on the record medium is relatively low, a relatively long time period is necessary for rewriting the information and the efficiency of the data processing becomes low.

SUMMARY OF THE INVENTION

The invention has for its object to provide a novel and useful method for rewriting information recorded on a record medium, in which the rewriting operation can be performed efficiently without wasting a data record region on the record medium and thus the data record region can be utilized optimally.

According to the invention, a method of rewriting information recorded on a record medium comprises the steps of:

reading the information out of said record medium to derive old file information, over which new file information is to be written;

detecting a difference between said old file information and the new file information to detect a portion of the new file information which is different from a corresponding portion of said old file information;

forming management information for denoting a fact that said portion of the old file information is to be rewritten by said portion of the new file information; and recording said portion of the new file information as well as said management information on said record medium.

The information rewriting method according to the invention is particularly suitable for a write-once type record medium such as an optical memory card or disk, but this method can be equally applied to a rewritable type record medium such as opto-magnetic disk or magnetic disk. In the method according to the invention, only the portion of the new file information which differs from the corresponding portion of the old file information is recorded on the record medium, so that the data record region of the record medium can be utilized optimally. That is to say, the data record region of the record medium is not wasted by recording the remaining portion of the new file information in a duplicate manner and therefore the data record area of the record medium can be used efficiently. Moreover, a necessary time period for rewriting the information can be minimized, and thus the rewriting operation can be carried out efficiently.

BRIEF DESCRIPTION OF THE DRAWINGS

FIG. 2 is a schematic view illustrating the old file read out of the optical memory card and the new file formed on the main memory disk in a first embodiment of the the information rewriting method according to the invention;

FIGS. 3A and 3B are schematic views depicting the data writing position information of the old file and the data writing position information of the new file, respectively;

FIG. 4 is a schematic view showing the data format of the file management information recorded in the directory section;

FIGS. 6A and 6B are schematic views illustrating the data format of the data writing position information of the old file and the data writing position information of the new file, respectively in a second embodiment of the information rewriting method according to the invention;

FIG. 7 is a plan view representing the optical memory card on which the information is recorded in the second embodiment of the invention;

FIG. 8 is a flow chart showing successive steps of the second embodiment of the information rewriting method according to the invention;

FIG. 9 is a schematic view representing the data format of the old file preserved on the main memory disk in a third embodiment of the information rewriting method according to the invention;

FIGS. 11A and 11B are schematic views denoting the data writing position information of the old file and new file, respectively; and FIG. 12 is a flow chart showing successive steps of the third embodiment of the information rewriting method according to the invention.

DESCRIPTION OF THE PREFERRED EMBODIMENTS

Now the present invention will be explained in detail with reference to embodiments. In the following embodiments, a write-once type optical memory card is used as the record medium, but according to the invention, it is also possible to use the rewritable type record medium such as the opto-magnetic disk or magnetic disk. Furthermore, in the following embodiments, a number of bytes of data included in one track on the optical memory card is treated as a unit of data. This unit is sometimes called a record. Therefore, a single track on the optical memory card corresponds to a single record.

Figure 1:
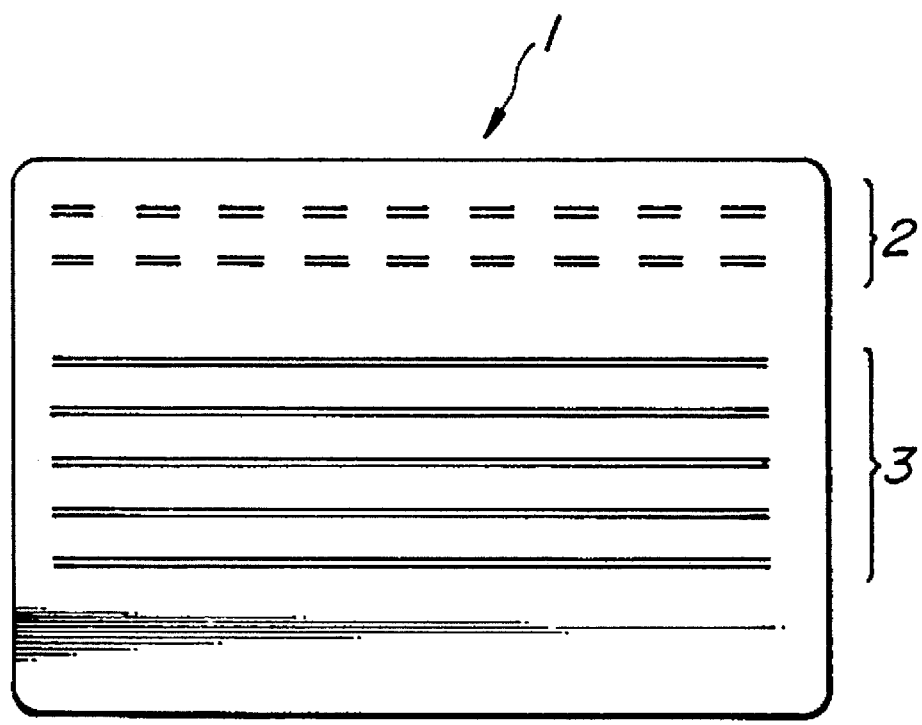
FIG. 1 is a plan view showing an optical memory card having a directory section and a data record section.

FIG. 1 is a plan view showing an embodiment of the optical memory card which can be advantageously used as the write-once type record medium in the method according to the invention. An optical memory card 1 includes a directory section 2 and a data record section 3. As usual, track management information for managing the file recorded in the data record section 3 is recorded in the directory section 2.

FIGS. 2, 3, 4 and 5 are schematic views illustrating the data format for explaining the information rewriting operation of a first embodiment of the method according to the invention. In FIG. 2, OL1. OLD represents an old file which has been written on the optical memory card 1 and OL1. NEW denotes a new file which is formed on a main memory disk such as a floppy disk or a hard disk. The old file OL1. OLD consists of a plurality of records OLD. REC1 to OLD. RECn each being formed by respective tracks. Similarly the new file OL1. NEW consists of a plurality of records NEW. REC1 to NEW. RECn. Portions in several records of the new file OL1. NEW represented by hatchings designate corrected or revised portions. That is to say, these portions in the new file OL1. NEW are different from corresponding portions in the old file OL1. OLD. In other words, the remaining portions of the new file OL1. NEW are entirely the same as corresponding portions of the old file OL1. OLD. According to the invention, only records including the revised portion of the new file are recorded on the record medium in order to save its data record area.

FIG. 3A shows recording position information of the records constituting the old file OL1. OLD record on the data record section 2 of the optical memory card 1 and FIG. 3B shows recording position information of the records of the new file after correction. The recording position information of the old file is included in the file management information and is recorded on a track in the data record section 3 of the optical memory card 1. The recording position information of the new file is stored on the main memory disk together with the new file records.

Now successive steps of the information rewriting operation in the present embodiment will be explained. At first, a first record OLD. REC1 of the old file OL1. OLD shown in FIG. 2 is read out of the optical memory card 1 and a first record NEW. REC1 of the new file OL1. NEW also shown in FIG. 2 is read out of the disk. Then, the thus read out records OLD. REC1 and NEW. REC1 are compared with each other byte by byte. Since no difference is found between these records OLD. REC1 and NEW. REC1, recording position information OLD. TRK1 of the record OLD. REC1 is preserved in the disk as shown in FIG. 3B without recording the record NEW. REC1 of the new file on the optical memory card 1.

Then, a second record OLD. REC2 of the old file OL1. OLD and a second record NEW. REC2 in the new file OL1. NEW are read out of the optical memory card 1 and main memory disk, respectively, and further the thus read out records are compared with each other byte by byte. In the second record NEW. REC2 of the new file, a revised portion is detected to be different from a corresponding portion of the second record OLD. REC2, so that the second record NEW. REC2 of the new file OL1. NEW is recorded in a vacant track in the data section 2 on the optical memory card 1. At the same time, the recording position information NEW. TRK2 of the record NEW. REC2 is preserved in the main memory disk as shown in FIG. 3B.

Next, a third record OLD. REC3 in the old file OL1. OLD is read out of the optical memory card 1 and is compared with a third record NEW. REC3 of the new file OL1. NEW read out of the main memory disk. The third record NEW. REC3 has a revised portion and differs from the third record OLD. REC3 of the old file, and thus the third record NEW. REC3 is recorded on a next vacant track in the data record section 3 on the optical memory card 1 and the recording position information NEW. TRK3 of the revised third record NEW. REC3 is preserved on the main memory disk as illustrated in FIG. 3B.

In the present example, successive records of the old file from OLD. REC4 to OLD. RECn are entirely the same as corresponding successive records of the new file from NEW. REC4 to NEW. RECn, so that these new records NEW. REC4 to NEW. RECn are not written on the optical memory card 1, and the recording position information for denoting positions of the old records OLD. REC4 to OLD. RECn is preserved in the main memory disk as shown in FIG. 3B.

In this embodiment, the number of records of the new file OL1 OLD is identical with the number of records of the old file OL1. NEW, but in general, there are two other cases. In a first case, when all the records of the old file OL1. OLD have been processed, one or more records of the corrected new file OL1. NEW remain. In such a case, all the remaining records of the new file are unconditionally recorded on the optical memory card and at the same time, recording position information of these new records is preserved on the main memory disk. In a second case, when all the records of the new file OL1. NEW have been processed, one or more records of the old file OL1. OLD still remain unprocessed. In this case, after the last record of the new file has been processed, the operation for recording the records of the new file OL1. NEW is immediately finished without processing the remaining records of the new file.

After all the revised records of the new file have been recorded on the optical memory card, said recording position information (see FIG. 3B) preserved on the main memory disk during the above mentioned process is recorded as the file management information in a vacant track 3a in the data record section 3 of the optical memory card 1. Said vacant track is one which immediately follows the last track in which the revised record has been recorded. Furthermore, an address of said track 3a in which the recording position information has been recorded is written as the file management information in a vacant region 2a of the directory section 2 together with a new file name OL1. NEW and old file name OL1. OLD as illustrated in FIG. 4. In this manner, the operation for rewriting the existing file on the optical memory card is completed. After that, the management of the files on the optical memory card is performed under the control of the new file name OL1. NEW.

According to the invention, a file having a file name which has been recorded in the directory section 2 together with a new file name is assumed to be erased. That is to say, in the above example, the old file OL1. OLD is considered to be erased after the rewriting operation.

Figure 5:
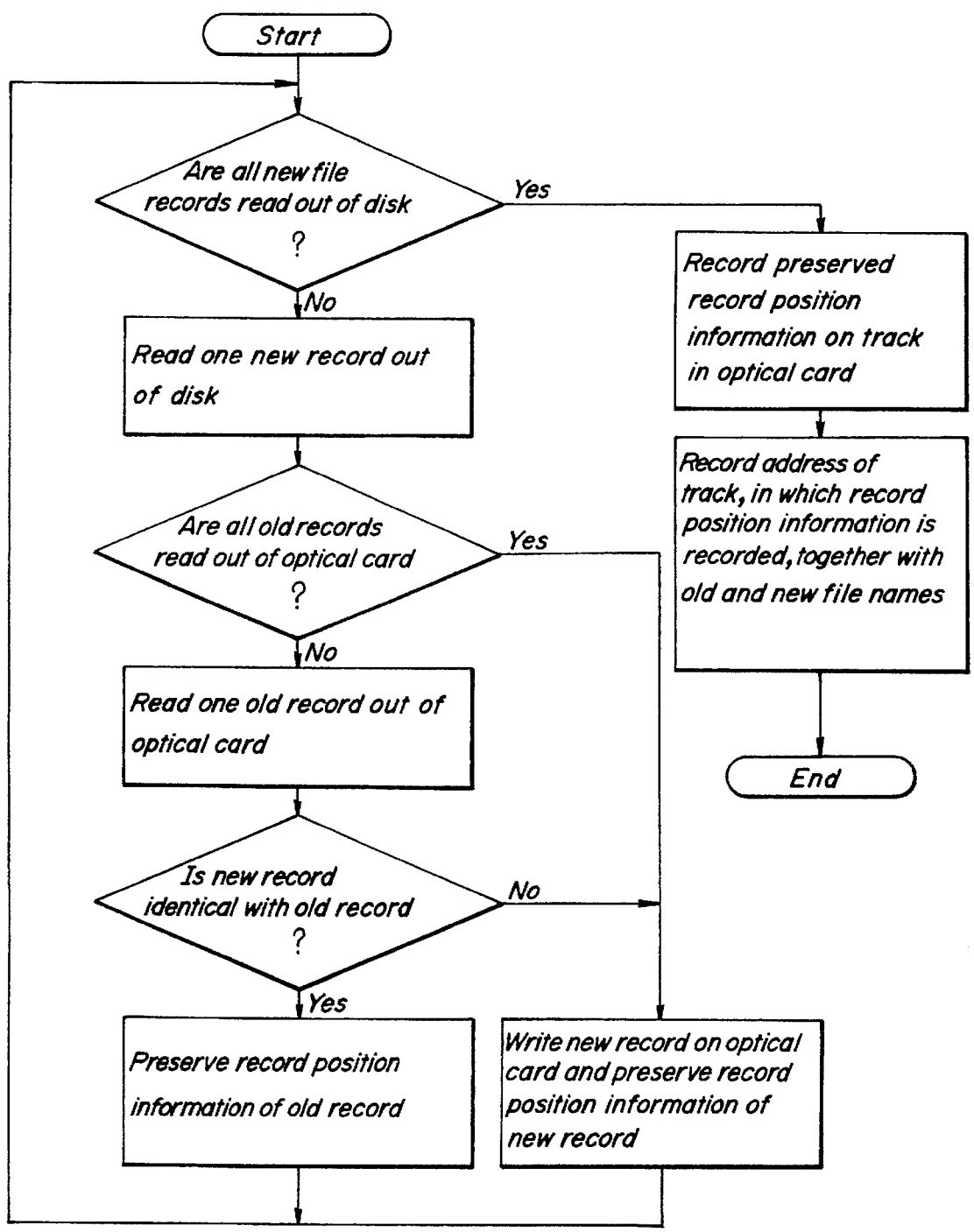
FIG. 5 is a flow chart showing successive steps of a first embodiment of the information rewriting method according to the invention.

FIG. 5 is a flow chart showing the above explained successive steps for rewriting the file recorded on the write-once type optical memory card. These steps have been fully explained so that its detailed explanation is dispensed with.

FIGS. 6A, 6B 7 and 8 are schematic views for explaining the operation of a second embodiment of the information rewriting method according to the invention. In the present embodiment, when a portion of the new file is detected to be different from a corresponding portion of the old file, a track number of a record including this revised portion in the write-once type record medium is recorded in an alternative information region as alternative information.

At first, a first record OLD. REC1 of the old file OL1. OLD recorded on the optical memory card 1 and a corresponding first record NEW. REC1 of the new file OL1. NEW stored on the main memory disk are read out and are then compared with each other byte by byte. No difference is found between these records OLD. REC1 and NEW. REC1, so that no process is performed.

Then, second records OLD. REC2 and NEW. REC2 of the old and new files OL1. OLD and OL1. NEW are read out of the optical memory card 1 and main memory disk, respectively, and are compared with each other byte by byte. In this case, the second record NEW. REC2 of the new file differs from the second record OLD. REC2 of the old file, and therefore is recorded in a vacant track in the data record section 3 of the optical memory card 1. As shown in FIG. 6B, the recording position information NEW. TRK2 of the second record NEW. REC2 written on the optical memory card 1 and the recording position information OLD. TRK2 of the second record OLD. REC2 of the old file OL1. OLD are preserved on the main memory disk as the alternative information together with the old and new file names OL1. OLD and OL1. NEW.

Next third records OLD. REC3 and NEW. REC3 of the old and new files OL1. OLD and OL1. NEW are read out and are compared with each other byte by byte. Since the third record NEW. REC3 of the new file differs from the third record OLD. REC3 of the old file, the revised third record NEW. REC3 is recorded in a next vacant track in the data record section 3 of the optical memory card 1. As illustrated in FIG. 6B, the recording position information NEW. TRK3 of the third record NEW. REC3 recorded on the optical memory card 1 and recording position information OLD. TRK3 denoting a track on which the record OLD. REC3 of the old file has been recorded on the optical memory card 1 are preserved on the main memory disk in a pairwise manner as alternative information OLD. TRK3; NEW. TRK3.

The remaining records of the new file NEW. REC4 to NEW. RECn are identical with the corresponding records of the old file OLD. REC4 to OLD. RECn, so that no recording process is performed. After the revised records of the new file have been recorded on the optical memory card 1, the alternative information which has been reserved on the main memory disk during the recording operation is now recorded in a vacant track in the data record section 3 of the optical memory card 1 and all the necessary operations for rewriting the file on the write-once type optical memory card 1.

As shown in FIG. 7, the record section 3 of the optical memory card 1 is provided with an alternative information record region 4 for recording the above mentioned alternative information shown in FIG. 6B. In the alternative information record region 4, the alternative information is recorded in successive tracks 4a without producing a vacant track. Information for managing the file on the optical memory card 1 may be set to the old file name (OL1. OLD in the second embodiment) or to both the old and new file names (OL1. OLD and OL1. NEW) when the old file name is also revised into the new file name as shown in FIG. 6B. This file management information is recorded in a vacant region in the directory record section 2 on the optical memory card 1.

Now the operation for reading the information from the optical memory card 1 will be explained in the second embodiment. At first, the alternative information denoting the position in the record section at which one or more revised records have been recorded is read out of the alternative information record region 4 on the optical memory card 1 under the control of the file management information recorded in the directory section 2 and is preserved on the main memory disk. Then, an old file name included in the alternative information and the directory information written in the directory section 2 of the optical memory card 1 are read to confirm whether or not the old file name in the alternative information is identical with the file name in the directory information. If these file names are identical with each other, it is determined that one or more records constituting this file have been subjected to the correction process, and one or more records are read out of the optical memory card 1 under the control of the the alternative information. This may be performed by replacing the position information of the record of the old file by the position information of the corresponding record of the new file.

FIG. 8 is a flow chart representing successive steps of the above explained information record method of the second embodiment. Also, the detailed explanation thereof is dispensed with.

FIGS. 9, 10, 11 and 12 are schematic views and a flow chart depicting the operation of a third embodiment of the information rewriting method according to the invention. In this embodiment, an old file recorded on the optical memory card is manually revised by a user with the aid of a keyboard.

At first, all records OLD. REC1 to OLD. RECn of an old file OL1. OLD written on the optical memory card 1 are read out and are preserved on the main memory disk as shown in FIG. 9. Then, the recording position information of these records OLD. REC1 to OLD. RECn is also preserved on the main memory disk as shown in FIG. 11A. Further, as shown in FIG. 9, record correction flags corresponding to the respective records OLD. REC1 to OLD. RECn are set on the main memory disk, and these flags are initially set to 0.

Figure 10:
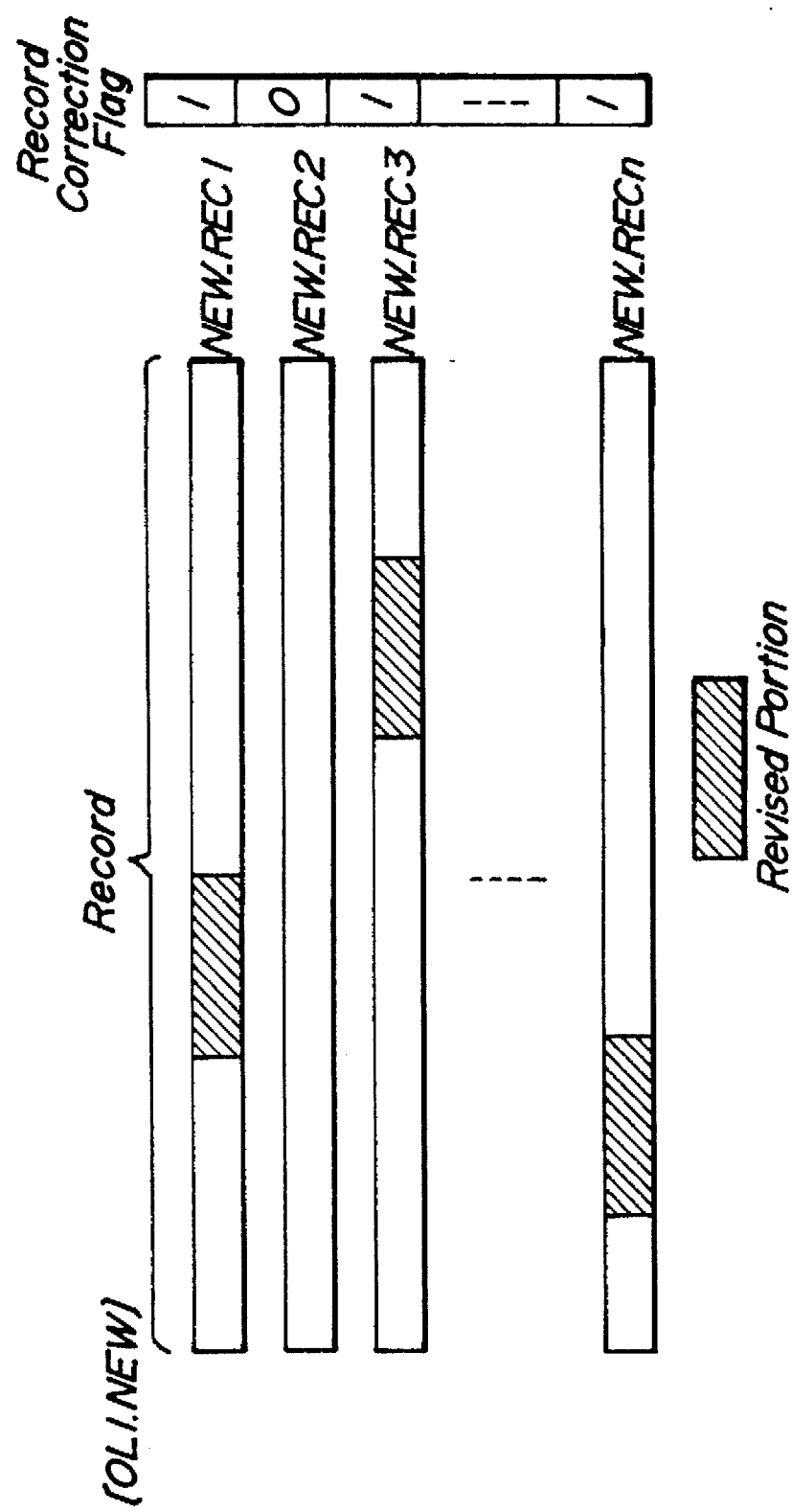
FIG. 10 is a schematic view showing the data format of the new file in the third embodiment.

On the main memory disk, one or more records of the old file OL1. OLD are corrected or revised by using the keyboard. When a record is corrected, its related flag is changed into 1 as illustrated in FIG. 10. Then, the recording position information is edited in the following manner with reference to the record correction flags shown in FIG. 10. It should be noted that the records of the new file are denoted by NEW. REC1 to NEW. RECn irrespective of the correction in the following explanation for the sake of simplicity.

First of all, the record correction flag of the first record NEW. REC1 on the main memory disk is checked. When the relevant correction flag is set to 1, it is confirmed that the correction has been performed for this record. Then, the relevant record NEW. REC1 is newly recorded on the optical memory card 1, while the recording position information NEW. TRK1 of this record NEW. REC1 written on the optical memory card 1 is preserved on the main memory disk as shown in FIG. 11B. The check is further performed for the record correction flag of the second record NEW. REC2 on the main memory disk. The correction flag of this record NEW. REC2 is set to 0, and no correction is performed, so that the relevant second record NEW. REC2 is not written on the optical memory card 1, and the recording position information OLD. TRK2 of the second record OLD. REC2 is preserved on the main memory disk as illustrated in FIG. 11B.

In this manner, record correction flags of successive records of the new file OL1. NEW are sequentially checked and records having correction flags set to 1 are newly recorded on the optical memory card 1, and then the related recording position information is preserved on the main memory disk as shown in FIG. 11B. A record having a record correction flag set to 0 is not newly recorded on the optical memory card, but only the recording position information of the old record is preserved on the main memory disk. After the checking, the recording position information shown in FIG. 11B is obtained on the main memory disk. Then, this recording position information is recorded on the optical memory card as the management information. In this case, the recording position information is recorded in a vacant track which immediately follows the last track in which a revised record has been recorded. As in the first embodiment, the address of this track in which the recording position information of the new file has been recorded is recorded as the file management information in a vacant region 2a of the directory section 2 on the optical memory card 1 together with the new file name OL1. NEW and old file name OL1. OLD. In this manner, all the necessary steps for rewriting the file on the optical memory card have been completed.

Also in the present embodiment, the file denoted by the old file name OL1. OLD is assumed to be erased, when this file name has been included in the file management information recorded on the directory section 2 of the optical memory card.

FIG. 12 is a flow chart showing the above mentioned successive steps for rewriting the information recorded on the optical memory card in the above explained third embodiment. These steps have been fully explained, so that its detailed explanation is dispensed with.

The invention is not limited to the embodiments so far explained, but various alternations and modifications may be made by those skilled in the art within the scope of the invention. For example, in the embodiments described above, the file name of the old file is changed into the new file name, however, according to the invention, the same file name may be used before and after the correction. In such a case only the contents of records of the file are changed. In the embodiments, a single track constitutes a single record which is treated as a minimum data unit, so that the record has a length corresponding to a number of bytes in one track, but according to the invention, a single record may have any length.

As fully described hereinbefore, according to the invention, the data record region of the record medium is efficiently utilized without recording the same data in a duplicate manner, because only a portion of a new file which differs from a corresponding portion of an old file is recorded on the record medium. That is to say, according to the present invention, the old file is revised only partially and a portion of the new file which is identical with a corresponding portion of the old file is not newly recorded on the record medium. This is particularly advantageous for the write-once type record medium such as the optical memory card or disk. Further, a necessary time period for recording the data on the record medium can be minimized, so that the rewriting operation can be performed promptly. This is particularly preferable for the record medium in which the data recording time is relatively long.

What is claimed is:

1. A method of rewriting information recorded on a record medium, said method comprising:

reading out of said record medium old file contents onto which new file contents are to be written;

detecting a difference between said old file contents and said new file contents to determine a portion of the new file contents which is different from a corresponding portion of said old file contents;

forming management information for denoting a fact that said portion of the old file contents is to be rewritten by said portion of the new file contents, said management information comprising recording position information which denotes a position on said record medium at which said portion of said new file contents is to be written;

recording said portion of the new file contents as well as said management information on said record medium, said recording position information being recorded in a vacant track in a data record section in the record medium; and recording, in a vacant region in a directory record section in said record medium, a position of said vacant track in which said recording position information has been recorded.

2. A method according to claim 1, wherein said record medium is formed by a write-once type record medium.

3. A method according to claim 2, wherein said write-once type record medium is formed by an optical memory card, and said unit record of the file is constituted by a single track on the optical memory card.

4. A method according to claim 1, wherein said old file contents are recorded on said record medium in a unit of records, and a revised record including said portion of said new file contents which is different from said corresponding portion of the old file contents is detected and is recorded on the record medium.

5. A method according to claim 4, wherein said record medium is formed by a write-once type record medium.

6. A method according to claim 5, wherein said write-once type record medium is formed by an optical memory card, and said unit record of the file is constituted by a single track on the optical memory card.

7. A method according to claim 4, wherein said recording position information denotes a position of said revised record which has been recorded on said record medium.

8. A method according to claim 7, wherein said record medium is formed by a write-once type record medium.

9. A method according to claim 8, wherein said write-once type record medium is formed by an optical memory card, and said unit record of the file is constituted by a single track on the optical memory card.

10. A method according to claim 7, wherein said recording position information includes an old file name and a new file name.

11. A method according to claim 10, wherein said record medium is formed by a write-once type record medium.

12. A method according to claim 11, wherein said write-once type record medium is formed by an optical memory card, and said unit record of the file is constituted by a single track on the optical memory card.

13. A method according to claim 10, wherein said recording position information includes alternative information representing said old and new file names and pairs of old record and new record positions and is recorded in a vacant track in an alternative information record region in the record medium, and said recording position information includes an address of said track in which said recording position information has been recorded and said old and new file names.

14. A method according to claim 13, wherein said record medium is formed by a write-once type record medium.

15. A method according to claim 14, wherein said write-once type record medium is formed by an optical memory card, and said unit record of the file is constituted by a single track on the optical memory card.

16. A method according to claim 10, wherein a record of the old file contents read out of the record medium is revised by operating a keyboard to form said revised record of the new file contents and a record correction flag of a record containing said corresponding portion of said old file contents is set, and said recording position information is recorded in a vacant track in a data record section in the record medium, and said recording position information includes an address of said track in which said recording position information has been recorded and said old and new file names.

17. A method according to claim 16, wherein said record medium is formed by a write-once type record medium.

18. A method according to claim 17, wherein said write-once type record medium is formed by an optical memory card, and said unit record of the file is constituted by a single track on the optical memory card.

19. A method of rewriting information recorded on a record medium which has a directory record section, a data record section and an alternative information section, said method comprising:

reading out of said record medium old file contents onto which new file contents are to be written;

detecting a difference between said old file contents and said new file contents to determine a portion of the new file contents which is different from a corresponding portion of said old file contents;

forming management information for denoting a fact that said portion of the old file contents is to be rewritten by said portion of the new file contents, said management information comprising recording position information which denotes a position in said data record section at which said portion of said new file contents is to be written;

recording said portion of the new file contents as well as said management information on said record medium, said portion of the new file contents being written into the data record section and said recording position information being written into said alternative information section; and recording, in a vacant region in said directory record section in said record medium, a position in said alternative information section at which said recording position information has been recorded.

20. A method according to claim 19, wherein the record medium is a write-once type record medium.

21. A method according to claim 20, wherein the alternative information section is a section which is distinct from the data record section, and wherein neither the old file contents nor the new file contents are written in the alternative information section.

22. A method according to claim 19, wherein the alternative information section is a section which is distinct from the data record section, and wherein neither the old file contents nor the new file contents are written in the alternative information section.

* * * * *